Patented Jan. 30, 1940

2,188,886

UNITED STATES PATENT OFFICE 2,188,886

CONDENSATION PRODUCT AND METHOD

Edwin T. Clocker, Bethlehem, Pa.

No Drawing. Application September 26, 1938,
Serial No. 231,760

19 Claims. (Cl. 260—414)

My invention relates to methods of producing an improved condensation product suitable for use in resins, lacquers, paints, varnishes, enamels, and plastic masses, and for similar purposes and to the new product so produced.

This application is a continuation in part of my copending application Serial No. 165,898, filed September 27, 1937, which is in turn a continuation in part of my copending applications Serial No. 759,086, filed December 24, 1934 and Serial No. 117,243, filed December 22, 1936, all for Condensation product and method. Serial No. 759,086 includes the generic claims and certain species relating to the condensation of an acyclic olefinic acid having less than ten carbon atoms in the carbon chain or its ester, with a nonconjugated, unsaturated, nonhydroxylated aliphatic acid having from ten to twenty-four carbon atoms in the carbon chain, or the salt or ester thereof. Serial No. 117,243 relates particularly to the maleic species. Serial No. 165,898 relates to salts and esters of the condensation product generically and water soluble salts specifically. Serial No. 165,899, filed September 27, 1937, for Condensation product and method, includes the subject matter relating to recondensation. Serial No. 165,900, filed September 27, 1937, for Coating product and method, is concerned particularly with coating. Serial No. 235,252, filed Oct. 15, 1938, for Condensation product and method, is directed to condensation with oleic acid and its compounds. Serial No. 231,759, filed Sept. 26, 1938, for Condensation product and method, is directed to the reaction product of the condensation product with a basic dyestuff. Serial No. 231,761, filed Sept. 26, 1938, for Oily dispersion material, covers oils, fats, and waxes emulsified by the condensation product of the invention.

A purpose of my invention is to produce water-insoluble salts by condensing an acyclic olefinic acid having less than ten carbon atoms in its carbon chain with one of the group consisting of nonconjugated unsaturated nonhydroxylated aliphatic acids having from ten to twenty-four carbon atoms in their carbon chains, nonhydroxylated salts thereof and nonhydroxylated esters thereof or similar compounds and causing the acidic condensation product to combine with a metal which produces a water-insoluble salt.

A further purpose is to condense an acyclic olifinic acid having less than ten carbon atoms in its carbon chain with an oil predominantly consisting of glycerides of linoleic and oleic acids, with or without glycerides of linolenic acid, such for example as an oil of the type of linseed or perilla, and to combine the acid condensation product with a metallic compound or metal to produce a water-insoluble salt.

A further purpose is to produce water-insoluble salts of condensation products formed by condensation of an acyclic olefinic acid having less than ten carbon atoms in its carbon chain at the carbon chain of a nonconjugated unsaturated nonhydroxylated fatty acid or the like by suitable application of heat and desirably also pressure. A temperature between 150° C. and 300° C. or higher is preferred for the condensation reaction, 180° C. to 260° C. being the most satisfactory range.

A further purpose is to produce water-insoluble salts of the condensation product formed by one molecular equivalent of acyclic olefinic acid having less than ten carbon atoms in its carbon chain and one molecular equivalent of nonconjugated unsaturated nonhydroxylated aliphatic acid having from ten to twenty-four carbon atoms in its carbon chain or a salt or ester thereof.

A further purpose is to condense maleic anhydride or the like with a nonconjugated drying oil such as linseed oil and then to react the condensation product with a metal or metal compound to produce a water-insoluble salt.

A further purpose is to employ as a water resistant coating a water-insoluble salt of the condensation product of an acyclic olefinic acid having less than ten carbon atoms in its carbon chain with a nonconjugated unsaturated nonhydroxylated aliphatic acid having from ten to twenty-four carbon atoms in its carbon chain, or a salt or ester thereof.

A further purpose is to combine an acidic condensation product of the present invention with a drier metal such as cobalt, manganese, cerium, lead or iron, or much less desirably copper, nickel, vanadium or chromium and/or with a drier hardener such as zinc.

A further purpose is to produce oil soluble driers by causing a metal or metal salt to combine with the acid portion of a condensation product produced from an acyclic olefinic acid or acid anhydride having less than ten carbon atoms in its carbon chain and a nonconjugated unsaturated nonhydroxylated fatty acid or the like having from ten to twenty-four carbon atoms in its carbon chain.

A further purpose is to produce a drier directly combined with the vehicle by uniting a suitable metallic compound with certain of the polar-reactive groups in my novel condensation product. Of course, the drier metal or metallic compound could be combined with the acidic group of the acyclic olefinic compound before the condensation takes place, and this is included in the invention.

Further purposes appear in the specification and in the claims.

It has been known for some time that maleic anhydride or substances yielding maleic anhydride will condense with carbon chain compounds containing a conjugated system of double bonds. For example, Morrell, Marks, and Samuels in British Patent No. 407,957 disclose a condensation of maleic anhydride with tung oil, a conjugated compound.

I have discovered that, under suitable conditions, maleic anhydride and compounds which behave similarly, as discussed below, will react with nonconjugated unsaturated nonhydroxylated fatty oils and acids or similar compounds, having from ten to twenty-four carbon atoms in the carbon chain, and the condensation product thus obtained may be formed into water-insoluble salts of desirable properties.

To produce the maleic condensation product, the maleic grouping must be present in condensable form, preferably as maleic anhydride. The condensation is, of course, obtained from any of the compounds which yield maleic anhydride and the like, such as malic acid, fumaric acid, maleic acid, aconitic acid or citric acid, if subjected to the conditions under which maleic anhydride is produced.

The production of maleic anhydride from such acids is well known in the art (Bernthsen, Text-book of Organic Chemistry (1923) pages 250–256. Instead of maleic anhydride, an acid ester of maleic acid, or a substituted maleic acid having less than ten carbon atoms in its carbon chain may be used.

Wherever I refer herein to an acid or acid group, I, of course, include an acid anhydride and an acid anhydride group, and vice versa.

Investigation of a large number of compounds has shown that condensation with a nonconjugated unsaturated nonhydroxylated aliphatic acid having from ten to twenty-four carbon atoms in the carbon chain is generally characteristic of acyclic olefinic acids having less than ten carbon atoms in the carbon chain. These acyclic olefinic acids may contain acid groups on one or both sides of the ethylene linkage. Such olefinic compounds are mono-substituted when they contain only one acid group; for example crotonic acid. Such olefinic compounds are di-substituted when they contain two acid groups; for example maleic anhydride, citraconic anhydride, maleic acid.

The longer the carbon chain of the acyclic olefinic acid, the less vigorous is the condensation reaction. Thus at the upper limit (nine carbon atoms in the carbon chain) the reaction is relatively mild. If there are less than seven carbon atoms in the carbon chain (for example six) the reaction is more vigorous. A still more vigorous reaction is obtained if there are less than five carbon atoms in the carbon chain. In all cases where I refer in the specification to less than ten carbon atoms in the carbon chain of the acyclic olefinic acid, it will be understood that a more vigorous reaction is obtained with acids having less than seven carbon atoms in the carbon chain, and a still more vigorous reaction with acids having less than five carbon atoms in the carbon chain. These carbon chains (less than seven and less than five) are to be taken as expressly included, although not specifically mentioned, because of a desire to shorten the specification.

As explained herein, in order to avoid a mere esterification of alcohol, as distinguished from a condensation at the double bond, the oil or similar compound should be nonhydroxylated. Where necessary, caution should be used to avoid hydroxylation by hydrolysis or otherwise. As is well known in the art, in order to prevent or minimize hydrolysis the reacting components should be reasonably dry, and water formed by decomposition of the reacting ingredients during the reaction should be removed. For example, if maleic acid (as distinguished from maleic anhydride) is caused to react with an oil or similar compound, it is preferable to use a relatively high temperature to cause rapid reaction, and it is preferable to permit elimination of the water formed by decomposition of the maleic acid into maleic anhydride. If maleic anhydride or a similar compound not producing water of decomposition is to be used, the desirability of avoiding refluxing of course ceases.

Condensation between maleic anhydride and the like and the carbon chain of a hydroxylated aliphatic salt or ester will only take place after esterification is complete, and in case maleic anhydride or the like in excess of that consumed by esterification is present in contact with the esterified hydroxylated aliphatic acid, salt or ester under the proper conditions.

The esterification of course produces a change in properties, and the condensation product of the hydroxylated salt or ester can in general be given properties comparable with those of the condensation product of a nonhydroxylated aliphatic acid, salt or ester only by destroying the esterification of the maleic anhydride or the like, as by hydrolysis.

Due to the difficulty in obtaining a condensation reaction between maleic anhydride and the like and a nonconjugated unsaturated nonhydroxylated aliphatic acid having from ten to twenty-four carbon atoms in the carbon chain, due to the change in properties caused by esterification and due to the difficulty of decomposing the ester, the claims have generally been drawn to exclude hydroxylated acids, salts and esters. This means that such acids, salts and esters are not sufficiently hydroxylated to interfere by esterification with the condensation.

In those cases where the claims do not exclude hydroxylated acids, salts and esters, it will be understood that more than esterification is intended—there should be condensation with the carbon chain of the acid, salt or ester. A typical hydroxylated fatty oil is castor oil.

A wide variety of nonconjugated unsaturated nonhydroxylated carbon chain compounds having from ten to twenty-four carbon atoms in the carbon chain may be employed. Esters of fatty acids with mono-, di- or poly-hydric alcohols, for example glyceryl or glycol esters, are particularly desirable. The free fatty acids are also used, as well as the fatty acid salts (soaps).

When reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A glyceride, for example, contains three such carbon chains united to the glyceryl group.

As examples of the type of nnoconjugated unsaturated nonhydroxylated aliphatic acids having from ten to twenty-four carbon atoms in the carbon chain which I may use, I suggest oleic, linoleic, linolenic, clupanodonic and undecylenic. The esters of the nonhydroxylated fatty acids are either glyceryl esters, which form oils such as corn, olive, cotton seed, peanut, linseed, sunflower, safflower, perilla, hemp seed, walnut seed, soya bean, rape seed, tomato seed, neat's foot, lard, cod liver, cod, burbet, salmon, menhaden, and many others, all nonconjugated unsaturated nonhydroxylated fatty oils, or esters of other alcohols, for example glycol esters. It will further be understood that mixtures of various esters, and/or of the free fatty acids, and/or of salts (soaps) may be employed if desired.

Most of the oils referred to above, such as oils of the linseed and perilla types, predominantly consist of glycerides of oleic and linoleic acids; that is, a mixture of glycerides of linoleic and oleic acids, containing more of linoleic and less of oleic or more of oleic and less of linoleic in the particular case, is the predominant constituent of said oils. In the case of an oil such as olive oil, glycerides of linoleic acid are subordinate to glycerides of oleic acid.

The invention may be practiced using a nonconjugated unsaturated nonhydroxylated aliphatic acid having from ten to twenty-four carbon atoms in the carbon chain, or using compounds of the acid such as esters of the acid, whether with mono-, di-, or poly-hydric alcohols, and salts of the acid. The question of whether the free acid or the ester is used is immaterial from the standpoint of the condensation reaction because the condensation reaction with the maleic anhydride or the like appears to involve the carbon chain at an intermediate point between its ends rather than the carboxyl group or neutralized carboxyl group at the end of the chain. The character of the product will vary depending upon whether the acid, ester or salt is used.

In the condensation, I will desirably employ one molecular equivalent of nonconjugated unsaturated nonhydroxylated aliphatic acid or the like to one molecular equivalent of acyclic olefinic acid and subject the mixture to a temperature of between 150° C. and 300° C. (more desirably between 180° C. and 260° C.) and preferably also to high pressure to facilitate the reaction. The temperature will in some cases be somewhat above 300° C. if the reacting components can stand such high temperature. Pressure will desirably be applied by simply confining the reacting components between the walls of some vessel such as a pressure autoclave and then heating the reacting components. Under these conditions, the pressure will equal the vapor pressure of the reacting components. Pressure can also be applied in any other suitable way, as by pumping the reacting components into the vessel or introducing an inert gas under pressure. I have used pressures up to 300 pounds per square inch with success. Of course the desirable pressure will vary with the individual reaction.

The time of reaction will depend upon the temperature, the pressure, the concentration and the character of the reactants. In general where the reactions are carried out under atmospheric pressure the minimum times of reaction for particular temperatures of reaction are:—

| Temperature | Minimum time |
| --- | --- |
| 150° C | Several hours. |
| 200° C | One hour. |
| 230° C | Thirty minutes. |
| 250° C | Twenty minutes. |
| 300° C | Ten minutes. |

Naturally to assure results at any of the temperatures, the period of reaction will be at least 2 or 3 times the minimum.

A suitable catalyst can be used to accelerate the yield. I do not, however, find that a catalyst is necessary.

The condensation reaction may also be carried out in the presence of suitable solvents although this is not usually necessary.

In ordinary practice I prefer not to use sufficient acyclic olefinic acid having less than ten carbon atoms in the carbon chain to saturate all of the double bonds in the fatty acid or fatty oil, etc., having from ten to twenty-four carbon atoms in the carbon chain. The condensation product thus ordinarily has an iodine value. Thus in olive oil one-third of the double bonds (one) is ordinarily saturated, and in linseed oil one-sixth (one), but in individual cases it may be desirable to saturate more ethylene linkages in the fatty oil and even to completely saturate them. To saturate all of the ethylene linkages in the oil, six molecular equivalents of acyclic olefinic compound having less than ten carbon atoms in the carbon chain are caused to react with one molecular equivalent of linseed oil.

Examples 1 to 5 given below clearly indicate the way in which my improved condensation product is obtained:

EXAMPLE 1

In a pressure autoclave, 180 parts by weight of raw alkali-refined linseed oil are mixed with 20 parts by weight of maleic anhydride. The temperature is maintained at from 230° C. to 260° C. for one hour, a pressure of about 30 pounds per square inch developing. The reaction can be obtained satisfactorily at 150° C., but is much slower at this low temperature, and the temperature may be raised to as much as 300° C. or even somewhat higher, but a high temperature may cause some difficulty due to carbonization. After cooling the reaction product is removed from the autoclave. The condensation product is slightly darker and more viscous than the original linseed oil. It is soluble in acetone, ethyl acetate, ether, xylene, carbon tetrachloride, higher petroleum hydrocarbons and turpentine; and semi-soluble in 95% ethyl alcohol. The condensation product is miscible with fatty oils and solutions of cellulose derivatives such as nitrocellulose in all proportions. The iodine value is 141.4, as against 190.0 for the original linseed oil. The saponification value is 288 and the acid value is 52.9, in the presence of ethyl alcohol.

EXAMPLE 2

Into a three-neck flask, equipped with a thermometer, mechanical stirrer and reflux condenser, 200 parts by weight of distilled oleic acid and 60 parts by weight of maleic anhydride are placed and heat is applied until the temperature of the mixture reaches 180° C.

The temperature is gradually raised from 180° C. to 250° C. over a period of one hour, during which time the amount of maleic anhydride condensed by the reflux progressively diminishes. The temperature is maintained at 250° C. to 260° C. until no more maleic anhydride appears to condense under the reflux. The temperatures given are those found best for carrying out the reaction, although temperatures between 150° C. and 300° C., or even somewhat higher, have been used.

The condensation product is soluble in ethyl alcohol, ether, xylene, carbon tetrachloride and solutions of cellulose derivatives such as nitrocellulose, but is substantially insoluble in petroleum hydrocarbons and fatty oils.

EXAMPLE 3

To 180 parts by weight of linseed oil are added 25 parts by weight of citraconic anhydride (a substituted maleic anhydride) and the mixture is heated in a three-neck flask, equipped with a reflux condenser, at about 250° C. for about three-quarters of an hour. At the end of this period, no further citraconic anhydride appears to condense under the reflux, indicating completion of the reaction. As a precaution, heating is continued for about 15 minutes longer. The reaction product is less viscous than the maleic condensation product of linseed oil obtained in Example 1, but has the same properties otherwise.

EXAMPLE 4

A mixture of 25 parts by weight of linseed oil and 2.4 parts by weight of crotonic acid (an acyclic olefinic acid) are heated under pressure in an autoclave at about 250° C. for about two hours. The condensation product has similar properties to the maleic-linseed oil condensation product obtained in Example 1.

EXAMPLE 5

A mixture of 900 parts by weight of linseed oil and 112 parts by weight of acid methyl maleate (a maleic acid compound having a single free acidic group) are heated under pressure at above 250° C. for about two hours. The condensation product is a drying oil.

My novel condensation product may be made with nonconjugated unsaturated nonhydroxylated drying, semi-drying and nondrying fatty oils having from ten to twenty-four carbon atoms in the carbon chain, or mixtures of the same, and the characteristics of the products are, to some extent, dependent upon the character of the oils or the like employed in the reaction. Where oils are used in the present invention, they will in most cases be oils predominantly consisting of glycerides of linoleic and oleic acids, that is, the predominant constituent will be a mixture of glycerides of these two acids, with or without important amounts of glycerides of linolenic and other nonconjugated fatty acids.

Without limiting myself to any exact structure for the condensation product, it would appear that the condensation product is an additional product at the carbon chain of the nonconjugated unsaturated nonhydroxylated fatty acid or the like, of the condensable olefinic compound or the like. For example, if linolenic acid reacts with maleic anhydride, the first step in the reaction appears to be in general as follows. Of course if enough maleic anhydride be present, the same reaction will take place at each double bond in the linolenic acid.

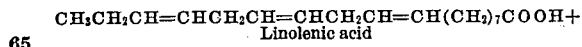
Linolenic acid

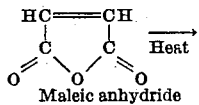
Maleic anhydride

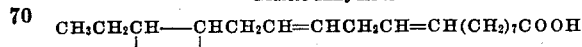

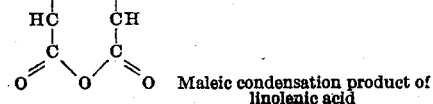 Maleic condensation product of linolenic acid

The iodine value of the condensation product confirms the above formula, and indicates that the ethylene linkage of the olefinic compound (in this case maleic anhydride) has been lost during condensation. It should be noted that one of the double bonds in linolenic acid and the ethylene linkage in maleic anhydride appear to have disappeared in the condensation product, forming a ring type compound with four carbon atoms in the ring.

The reaction above may be modified in well-known manner if a glyceryl ester of linolenic acid instead of linolenic acid be used, or if some other nonconjugated unsaturated nonhydroxylated aliphatic acid having from ten to twenty-four carbon atoms in the carbon chain be employed or if some other acyclic olefinic acid having less than ten carbon atoms in the carbon chain be used instead of or in mixture with maleic anhydride.

It should be noted that the maleic acid or acid anhydride product of linolenic acid or any similar acid has a carboxyl group capable of reacting at the end of the linolenic or other similar carbon chain, and also an acyclic olefinic acid group capable of reacting. The condensation will take place notwithstanding that both of these groups have been esterified before the condensation reaction, but the presence of the unesterified polar-reactive groups is of great advantage for many purposes as later explained.

When maleic acid or a substance yielding maleic acid is condensed with a nonconjugated unsaturated nonhydroxylated fatty oil or the like, it appears to change to maleic anhydride and the maleic anhydride condensation product results.

Water-insoluble salts of the condensation product of the present invention are desirable particularly for water resistant films and for driers for paints, varnishes, lacquers, etc. The acidic group of the condensation product is capable of reacting with a wide variety of metals and metal compounds which will react with acids to give water-insoluble salts. The salts of silver, aluminum, barium, bismuth, calcium, cadmium, cerium, cobalt, chromium, copper, iron, lead, magnesium manganese, molybdenum, nickel, strontium, titanium, vanadium, zinc and zirconium are substantially water-insoluble and may be formed by reacting the acidic condensation product of the present invention with suitable oxides or hydroxides of the metals in question and in some cases by combination with the metals themselves.

EXAMPLE 6

The water-insoluble acid salts of the maleic anhydride condensation product of linseed oil are generally viscous liquids while the completed salts are of jelly-like or cheesy consistence. The calcium acid salt of the maleic-linseed oil condensation product of Example 1 is applied as a coating for lining cans and other containers in which foods are shipped. It may be formed readily by treating the material of Example 1 with the theoretical amount of lime. It forms a water-resistant film of moderate hardness. Xylene is suitably used as a thinner.

When food products are not to be encountered, the lead, zinc, strontium, barium or aluminum salts of the linseed oil or other suitable condensation product are dissolved in suitable solvents to form varnishes of very high water-resistance.

The calcium, strontium, barium, zinc, aluminum and lead salts of the condensation product of an acyclic olefinic acid having less than ten carbon atoms in its carbon chain and a nonconjugated unsaturated nonhydroxylated drying oil having from ten to twenty-four carbon atoms in its carbon chain, have desirable properties for painting porous materials like concrete, plaster and other materials used in building blocks, walls, fireproofing, heat insulation and soundproofing. The bridging quality of the films of these compounds is highly developed so that they may be painted over small voids, irregularities and imperfections to produce a relatively tough smooth film without excessive waste of paint through soaking into the porous material. Desirable properties from these standpoints are possessed by both the acid salts and the completed salts. In the case of the completed salts, the problem of thinning is more difficult and considerable quantities of volatile thinner are necessary, whereas in the case of the acid salts much less thinner is required. The films produced by these salts are very resistant to water.

Driers can of course be simply dissolved in the oily condensation product of the present invention. Thus the condensation product of maleic anhydride and a nonconjugated unsaturated nonhydroxylated drying oil will dry in air at ordinary temperatures to form a hard dry film whether or not driers are used. Likewise the condensation products of nonconjugated unsaturated nonhydroxylated drying oils generally exhibit thermohardening properties, being convertible at 70° C. to 80° C. for example into hard resistant varnishlike films in short periods of time. An example of the drying behavior of the condensation product obtained in Example 1 is as follows.

EXAMPLE 7

A 1:1 xylene solution of the reaction product obtained in Example 1 to which soluble driers are added to the extent of 0.03% of cobalt, 0.05% of manganese and 0.5% of lead, for example in the form of linoleates or resinates, drys to a hard film at room temperature in about 5 hours and may be stoved to a hard film at 80° C. in about 1½ hours. The film produced is not acted upon by water, ethyl alcohol, benzene, or xylene.

Very satisfactory oil soluble driers may be manufactured by causing the condensation product of an acyclic olefinic acid having less than ten carbon atoms in its carbon chain and a nonconjugated unsaturated nonhydroxylated aliphatic acid or the like having from ten to twenty-four carbon atoms in the carbon chain, particularly a glyceride of such acid, to react with a metal oxide, hydroxide, carbonate or acetate or similar compound of the drier metal capable of combination with the acidic condensation product. For example, the oxides, hydroxides, and carbonates and acetates in the presence of water and many other salts of cobalt, manganese, cerium, lead and iron can be caused to react with the maleic anhydride condensation product of linseed oil prepared as described in Example 1 (or any other acidic condensation product of the invention), to form driers chemically combined with the vehicle which are readily soluble in linseed oil and very useful in the paint, varnish and lacquer industries.

Such a drier may be made by adding a small percentage of lead oxide to the maleic anhydride condensation product of linseed oil (for example, enough to introduce ½% of lead into the condensation product).

The most satisfactory drier metals are in order of preference cobalt, manganese, cerium, lead and iron. Copper nickel, vanadium and chromium are less satisfactory drier metals. The oxides, hydroxides, carbonates or acetates of any of these drier metals may be combined with the acidic group of the condensation product of the present invention, or they may be combined with the acyclic olefinic acid before the condensation product is made.

For commercial work it is frequently desirable to employ cobalt, manganese and lead in combination with the acidic group of the condensation product. To introduce lead, white lead may be employed.

In some cases it is desirable to use a film hardener as well as a drier. Zinc oxide or some other basic salt of zinc will be combined with the acidic group introduced by the olefinic acid to act as a hardener, desirably in the presence of cobalt, and particularly where alkyl resins or oleo-resins are used in varnishes and the like.

Where metallic coatings are to be produced, free acidic groups in the vehicle are desirable, as the acidic group acts upon the metal to be coated to produce tenacious adherence. This specially suits the product to use as a base or priming coat for metal. The drier metals are desirably added as in the following example.

EXAMPLE 8

To the acidic condensation product of Example 1, soluble driers are added to the extent of about 0.03% of cobalt, 0.05% manganese and 0.5% lead in the form of oxides or other salts which can be combined with the acidic group. Half of a clean zinc plate is dipped into the oily condensation product after which the coating is allowed to air dry for 48 hours.

The film adheres very tenaciously to the metallic surface, and, if the film is removed by a solvent, the surface to which the film was attached shows a slight etching effect while the surface of the zinc which was not coated is unaffected. The etching effect appears to be due to the action of the acidic group in the maleic condensation product of linseed oil on the metal.

The property of firm adherence to metal surfaces is exhibited with all of the ordinary structural and coating metals, such as zinc, lead, tin, aluminum, copper, iron, chromium, cadmium, etc., and their various alloys, such as steel, nichrome, brass, bronze, zinc die-cast metal, etc. A salt of the maleic anhydride condensation product of linseed oil dries much more quickly on copper than linseed oil, probably because the copper salt of the condensation product acts as a drier. Adherence to copper is extremely firm.

The properties of the paint of the last example are particularly desirable because the films are of high hardness and considerable resistance of weathering, and pitting and chipping are not serious. Where pigments are incorporated with the paints of the present invention, the acidic group present gives good adherence to the pigment which would not be possible otherwise. The degree of permanence of the suspension of pigment is also increased by the emulsifying action of the condensation product of the present invention. The paints also show superior leveling properties. Controlled penetration into wood and similar permeable materials is obtained with the acidic condensation product of the present invention, and separation of the oily material from the pigment, if pigment is used, will be avoided, apparently due to the acidic group of the condensation product.

A desirable colored insoluble condensation product may be produced by reacting the acidic groups of the condensation product in part with a metal or metallic compound to produce an insoluble salt, and in part with a basic dyestuff such as a basic dye or its dye base. This subject matter is claimed in my copending application Serial No. 231,759.

The colored water-insoluble salt of the condensation product of maleic anhydride or the like and a drying oil is preferably used with or without the addition of a synthetic or natural resin. The acidic group of the acyclic olefinic acidic condensation product appears to combine with the basic group of the dyestuff. The reaction may be brought about directly or in the presence of a suitable solvent.

EXAMPLE 9

A solution of 1 part by weight of Victoria blue dye base in 10 parts by weight of hot toluene is mixed with 100 parts by weight of the calcium acid salt obtained in Example 6 of the maleic-anhydride-linseed-oil condensation product of Example 1. The blue color of the dye is developed by the acid anhydride group of the condensation product. By the addition of driers, the product may be dried to a water-resistant colored film.

Some of the basic dyestuffs which may be used for example instead of Victoria blue to produce colored lacquers are:

Red

Magenta, Color Index No. 677.
Safranine, Color Index No. 841.
Rhodamine, Color Index No. 749.
Toluidine red, Color Index No. 69.

Violet

Crystal violet, Color Index No. 681.
Paraphenylene violet, Color Index No. 858.

Blue

Methylene blue, Color Index No. 922.
Victoria blue, Color Index No. 729 (already mentioned).
Night blue, Color Index No. 731.
Paraphenylene blue, Color Index No. 863.

Yellow

Leather yellow, Color Index No. 793.
Chrysoidine, Color Index No. 20.

Green

Malachite green, Color Index No. 657.
Brilliant green, Color Index No. 622.
Azine green, Color Index No. 834.

Brown

Bismark brown, Color Index No. 332.

Powerful basic dyestuffs combined with the condensation product tend to retard drying, and more drier should be used where such a dyestuff is present.

I will to advantage produce water-insoluble salt-esters of the condensation product of the present invention. To the water-insoluble acid salt of the condensation product as obtained for instance in Example 6, a suitable alcohol is added to esterify the free acidic groups. The alcohol may be either aliphatic or aromatic and either mono-, di-, or poly-hydric. The esterified water-insoluble salt of the condensation product of maleic anhydride and a nonconjugated unsaturated nonhydroxylated fatty drying oil dries in air or under artificial heating in the presence of suitable driers and is useful as a water-resistant paint, varnish or lacquer film-forming material which is chemically neutral in properties.

EXAMPLE 10

A typical case of esterification is exhibited when 25 parts by weight of the calcium acid condensation product of maleic anhydride and linseed oil as obtained for instance in Example 6 are mixed with 1.6 parts by weight of ethylene glycol and the mixture is maintained at about 180° C. until the reaction ceases. A 1:1 xylene solution of the reaction product, when treated with a suitable quantity of metallic driers as explained herein, dries at room temperature to a hard film in a few hours. The film is resistant to water and some organic solvents.

In the above reaction the ethylene glycol neutralizes part of the remaining acidic groups and forms an ester. Of course, if the starting material is a condensation product of linolenic acid instead of a condensation product of its glyceride, esterification takes place at the carboxyl group as well as at the acid anhydride group, as the condensation product is then polar-reactive at two distinct parts of the molecule.

At a number of points in the present application it is indicated that the salt is formed by reaction with the base after completion of the condensation between an acyclic olefinic acid having less than ten carbon atoms in its carbon chain and a nonconjugated unsaturated nonhydroxylated aliphatic acid having from ten to twenty-four carbon atoms in its carbon chain or a nonhydroxylated salt or nonhydroxylated ester thereof. It will, however, be understood that in some cases the order of reaction may be varied without affecting the character of the product and all such equivalent procedure is intended to be included within the scope of the claims.

In some cases a nonconjugated unsaturated nonhydroxylated aliphatic acid, nonhydroxylated salt or nonhydroxylated ester, having from ten to twenty-four carbon atoms in the carbon chain is referred to as a fatty acid compound or compound having the fatty acid grouping.

It will be understood that some variations in desirable temperatures and pressures will be found for different compounds.

Throughout the specification and claims, where I refer to nonconjugated unsaturated nonhydroxylated aliphatic acids having from ten to twenty-four carbon atoms in the carbon chain, or nonhydroxylated salts or nonhydroxylated esters thereof, I mean such acids, salts or esters as are unoxidized or nonpolymerized or not sufficiently oxidized or polymerized to interfere with the reactions disclosed herein. Thus, in referring to linseed oil, I mean the product generally known as such, raw or refined, and not linseed oil sufficiently oxidized or polymerized to prevent or seriously interfere with the formation of a condensation product at a double bond. In other words, I do not intend to exclude others from mere esterification of oxidized or polymerized fatty oils by maleic anhydride.

Many of the fish oils contain varying percentages of fatty alcohols, which will of course react with maleic anhydride to form esters. The esterified fatty alcohols may be allowed to remain in the condensation product, or the alcohols may be removed before condensation takes place.

It will be evident that the condensation product of my invention may be oxidized subsequent to condensation.

Where reference is made to poly-hydric alcohols, it is intended to include di-hydric alcohols. Under the designation poly-hydric alcohols, it is intended to include substituted poly-hydric alcohols such as glycol mono-ethyl ether. Reference to acids is intended to include acid anhydrides and half esters of acids. Reference to esters is intended to include partially completed esters such as half esters.

It will be understood that the condensation of minute amounts of the olefinic compound with the nonconjugated unsaturated nonhydroxylated fatty compound will not appreciably change the character of the latter. In general, at least 1% (based on the weight of the condensation product) of the olefinic compound should be combined with the nonconjugated unsaturated nonhydroxylated fatty compound in the product to insure a distinctive character of the product.

In view of my invention and disclosure variations and modifications to meet individual whim or particular need will doubtless become evident to others skilled in the art, to obtain all or part of the benefits of my invention without copying the exact process or product described, and I, therefore, claim all such in so far as they fall within the reasonable spirit and scope of my invention.

Having thus described my invention, what I claim as new and desire to secure by Letters Patent is:

1. The process of producing a water-insoluble synthetic material, which comprises condensing an acyclic olefinic acid having less than ten carbon atoms in the carbon chain and one of the group consisting of nonconjugated unsaturated nonhydroxylated aliphatic acids having from ten to twenty-four carbon atoms in their carbon chains, nonhydroxylated salts and nonhydroxylated esters thereof, at a temperature of between 150° and 300° C. and continuing the heating until a substantial quantity of the acyclic olefinic acid is combined at an intermediate point in the carbon chain of the one of the group, and combining an acidic group introduced by the olefinic acid with a metal forming a water-insoluble salt.

2. The process of forming a vehicle for paint and the like with the drier a part of the vehicle, which comprises condensing a nonconjugated unsaturated nonhydroxylated drying oil with an acyclic olefinic acid having less than ten carbon atoms in the carbon chain, at a temperature in excess of 150° C., and continuing the heating until a substantial quantity of the acyclic olefinic acid is combined at an intermediate point in the carbon chain of the fatty acid of the oil, thereby forming a vehicle, and reacting the acidic group of the vehicle with a metal compound which possesses drying properties, thereby forming a drier in the vehicle.

3. The process of forming an oil-soluble drier, which comprises combining an acid containing the maleic grouping at a point of unsaturation in the carbon chain of the fatty acid of a nonconjugated unsaturated nonhydroxylated fatty oil having from ten to twenty-four carbon atoms in the carbon chain at a temperature in excess of 200° C. and for a time sufficient to produce a substantial amount of the condensation product, and combining the acidic grouping with a drier metal.

4. A water-insoluble synthetic material, comprising the reaction product of an acyclic olefinic acid having less than ten carbon atoms in the carbon chain and one of the group consisting of nonconjugated unsaturated nonhydroxylated aliphatic acids having from ten to twenty-four carbon atoms in their carbon chains, nonhydroxylated salts and nonhydroxylated esters thereof, reacted at a temperature in excess of 150° C., with continuance of the heating until a substantial quantity of the acyclic olefinic acid is combined at an intermediate point in the carbon chain of the one of the group, the acidic group introduced by the olefinic acid being combined with a metal forming an insoluble salt.

5. A water-insoluble synthetic material, comprising the product of condensation of an acyclic olefinic acid having less than ten carbon atoms in the carbon chain and one of the group consisting of nonconjugated unsaturated nonhydroxylated aliphatic acids having from ten to twenty-four carbon atoms in their carbon chains, nonhydroxylated salts and nonhydroxylated esters thereof, reacted at a temperature in excess of 150° C. with continuance of the heating until a substantial quantity of the acyclic olefinic acid is combined at an intermediate point in the carbon chain of the one of the group, in the proportions of one molecular equivalent of each, with a metal forming a water-insoluble salt combined to the acidic group introduced by the olefinic acid.

6. A water-insoluble synthetic material, comprising the product of condensation of maleic anhydride and one of the group consisting of nonconjugated unsaturated nonhydroxylated aliphatic acids having from ten to twenty-four carbon atoms in their carbon chains, nonhydroxylated salts and nonhydroxylated esters thereof, reacted at a temperature in excess of 200° C. and for a time sufficient to produce a substantial amount of the condensation product, combined at the acidic group with a metal forming a water-insoluble salt.

7. A water-insoluble synthetic material, comprising the product of condensation of an acyclic olefinic acid having less than ten carbon atoms in the carbon chain and an oil predominantly consisting of glycerides of linoleic and oleic acids, reacted at a temperature in excess of 150° C. with continuance of the heating until a substantial quantity of the acyclic olefinic acid is combined at an intermediate point in the carbon chain of the fatty acid of the oil, the acidic group being combined with a metal forming a water-insoluble salt.

8. A water-insoluble synthetic material, comprising the condensation product of an acyclic olefinic acid having less than ten carbon atoms in the carbon chain and linseed oil, reacted at a temperature in excess of 150° C. with continuance of the heating until a substantial quantity of the acyclic olefinic acid is combined at an intermediate point in the carbon chain of the fatty acid of the oil, the acidic group being combined with a metal forming a water-insoluble salt.

9. A water-insoluble synthetic material, comprising the product of condensation at a double bond in the oil of maleic anhydride and linseed oil in the proportions of not substantially more than enough of the maleic anhydride to saturate the oil, the acidic group being combined with a metal forming a water-insoluble salt.

10. A water-insoluble synthetic material comprising the product of condensation of an acyclic olefinic acid having less than ten carbon atoms in the carbon chain and perilla oil reacted at a temperature in excess of 150° C. with continuance of the heating until a substantial quantity of the acyclic olefinic acid is combined at an intermediate point in the carbon chain of the fatty acid of the oil, the acidic group being combined with a metal forming a water-insoluble salt.

11. An oil-soluble drier comprising a chemical compound with a drier metal at the acidic group of a reaction product of an acyclic olefinic acid having less than ten carbon atoms in the carbon chain at an olefinic linkage of the fatty acid of a nonconjugated unsaturated nonhydroxylated fatty oil having from ten to twenty-four carbon atoms in the carbon chain, reacted at a temperature in excess of 150° C. with continuance of the heating until a substantial quantity of the acyclic olefinic acid is combined at an intermediate point in the carbon chain of the fatty acid of the oil.

12. A drier or the like comprising the product of reaction of maleic anhydride and linseed oil reacted at a temperature in excess of 150° C. with continuance of the heating until a substantial quantity of maleic anhydride is combined at an intermediate point in the carbon chain of the fatty acid of the oil, with the acidic group combined with a drier metal.

13. A drier comprising the product of reaction at a double bond in the oil of maleic anhydride and linseed oil in the proportions of not substantially more than enough of the maleic anhydride to saturate the oil, with acidic groups combined with cobalt, manganese and lead.

14. A water-insoluble synthetic material comprising the condensation product of an acyclic olefinic acid having less than ten carbon atoms in the carbon chain and one of the group consisting of nonconjugated unsaturated nonhydroxylated aliphatic acids having from ten to twenty-four carbon atoms in their carbon chains, nonhydroxylated salts and nonhydroxylated esters thereof, reacted at a temperature in excess of 150° C. with continuance of the heating until a substantial quantity of the acyclic olefinic acid is combined at an intermediate point in the carbon chain of the one of the group, the acidic groups introduced by the olefinic acid being in part combined with a metal forming a water-insoluble salt, and in part free.

15. A water-insoluble synthetic material comprising the condensation product of an acyclic olefinic acid having less than ten carbon atoms in the carbon chain and a nonconjugated unsaturated nonhydroxylated fatty oil, reacted at a temperature in excess of 200° C. and for a time sufficient to produce a substantial amount of the condensation product, the acidic group introduced by the olefinic acid being combined with a metal of the class consisting of calcium, strontium, barium, zinc, aluminum, and lead.

16. A coating material comprising the calcium salt of the condensation product of an acyclic olefinic acid having less than ten carbon atoms in the carbon chain and a nonconjugated unsaturated nonhydroxylated drying oil reacted at a temperature in excess of 150° C. with continuance of the heating until a substantial quantity of the acyclic olefinic acid is combined at an intermediate point in the carbon chain of the fatty acid of the oil.

17. A coating material possessing superior bridging qualities and comprising the condensation product at a double bond in the oil of maleic anhydride and linseed oil in the proportions of not substantially more than enough of the maleic anhydride to saturate the oil, reacted with a metal of the class which consists of calcium, strontium, barium, zinc, aluminum, and lead.

18. A water-insoluble synthetic material, comprising the condensation product of an acyclic olefinic acid having less than ten carbon atoms in the carbon chain and one of the group consisting of nonconjugated unsaturated nonhydroxylated aliphatic acids having from ten to twenty-four carbon atoms in their carbon chains, nonhydroxylated salts and nonhydroxylated esters thereof, reacted at a temperature in excess of 150° C., with continuance of the heating until a substantial quantity of the acyclic olefinic acid is combined at an intermediate point in the carbon chain of the one of the group, with the acidic groups introduced by the olefinic acid in part combined with a material forming an insoluble salt and in part combined with an alcohol, whereby a water-insoluble salt-ester is produced.

19. A water-insoluble synthetic material, comprising the condensation product of an acyclic olefinic acid having less than ten carbon atoms in the carbon chain and one of the group consisting of nonconjugated unsaturated nonhydroxylated aliphatic acids having from ten to twenty-four carbon atoms in their carbon chains, nonhydroxylated salts and nonhydroxylated esters thereof, reacted at a temperature in excess of 200° C. with the acidic groups introduced by the olefinic acid in part combined with a material forming an insoluble salt and in part combined with a poly-hydric alcohol, whereby a water-insoluble salt-ester is produced.

EDWIN T. CLOCKER.